United States Patent
Tochikawa et al.

(10) Patent No.: US 7,322,186 B2
(45) Date of Patent: Jan. 29, 2008

(54) EXHAUST GAS PURIFYING SYSTEM FOR INTERNAL COMBUSTION ENGINE

(75) Inventors: Kazuharu Tochikawa, Kariya (JP); Makoto Saito, Okazaki (JP); Shigeto Yahata, Obu (JP); Tsukasa Kuboshima, Okazaki (JP); Kanehito Nakamura, Ichinomiya (JP)

(73) Assignee: Denso Corporation, Kariya-city, Aichi-pref. (JP)

(*) Notice: Subject to any disclaimer, the term of this patent is extended or adjusted under 35 U.S.C. 154(b) by 338 days.

(21) Appl. No.: 11/220,596

(22) Filed: Sep. 8, 2005

(65) Prior Publication Data
US 2006/0048507 A1 Mar. 9, 2006

(30) Foreign Application Priority Data
Sep. 9, 2004 (JP) .............................. 2004-262295
Jun. 20, 2005 (JP) .............................. 2005-179423

(51) Int. Cl.
*F01N 3/00* (2006.01)
*F01N 3/02* (2006.01)
(52) U.S. Cl. .......................................... 60/297; 60/311
(58) Field of Classification Search ................. 60/297, 60/311
See application file for complete search history.

(56) References Cited

U.S. PATENT DOCUMENTS

| | | | | |
|---|---|---|---|---|
| 5,195,316 A * | 3/1993 | Shinzawa et al. | ............. | 60/274 |
| 6,090,187 A * | 7/2000 | Kumagai | .................... | 95/278 |
| 6,758,039 B2 * | 7/2004 | Kuboshima et al. | .......... | 60/311 |
| 6,820,418 B2 * | 11/2004 | Nakatani et al. | .............. | 60/297 |
| 6,829,889 B2 * | 12/2004 | Saito et al. | .................... | 60/291 |
| 6,907,873 B2 * | 6/2005 | Hamahata | ................... | 123/676 |
| 6,966,178 B2 * | 11/2005 | Saito et al. | .................... | 60/295 |
| 7,076,944 B2 * | 7/2006 | Okugawa et al. | ............. | 60/295 |
| 7,086,220 B2 * | 8/2006 | Imai et al. | ..................... | 60/274 |
| 7,159,392 B2 * | 1/2007 | Kondoh et al. | ................ | 60/297 |
| 7,174,706 B2 * | 2/2007 | Kuboshima et al. | .......... | 60/295 |
| 7,188,512 B1 * | 3/2007 | Wills | .......................... | 73/23.31 |
| 2004/0172933 A1 | 9/2004 | Saito et al. | | |

FOREIGN PATENT DOCUMENTS

JP 07-332065 12/1995

OTHER PUBLICATIONS

U.S. Appl. No. 11/228,292, filed Sep. 19, 2005.
U.S. Appl. No. 11/070,368 to Saitoh et al. filed Mar. 3, 2005.

* cited by examiner

*Primary Examiner*—Thomas Denion
*Assistant Examiner*—Loren Edwards
(74) *Attorney, Agent, or Firm*—Nixon & Vanderhye P.C.

(57) ABSTRACT

In an exhaust gas purifying apparatus for a diesel engine having a diesel particulate filter provided in an exhaust pipe, a pressure loss at the filter is detected. An accumulated amount of diesel particulates in the filter is calculated based on the pressure loss and a map for a relationship between the pressure loss and the accumulated amount. A compulsory re-generating operation is carried out when the calculated accumulated amount reaches at a predetermined threshold value, which is decreased to a smaller value depending on a combustion amount of the diesel particulates which are combusted and removed from the filter as a natural re-generating operation.

9 Claims, 7 Drawing Sheets

EXHAUST GAS PURIFYING SYSTEM FOR INTERNAL COMBUSTION ENGINE

CROSS REFERENCE TO RELATED APPLICATION

This application is based on Japanese Patent Application Nos. 2004-262295 and 2005-179423, which are respectively filed on Sep. 9, 2004 and Jun. 20, 2005, the disclosures of which are incorporated herein by reference.

FIELD OF THE INVENTION

The present invention relates to an exhaust gas purifying system for an internal combustion engine, and in particular relates to a technology for re-generating a diesel particulate filter (DPF) provided in an exhaust pipe of the engine.

BACKGROUND OF THE INVENTION

It has been required to improve emission control for an internal combustion engine mounted in an automotive vehicle. It is necessary for a diesel engine, which is a compression ignition type engine operated with diesel oil, to reduce smoke and exhausted diesel particulates such as SOF contained in exhaust gas, in addition to CO, HC, NOx. To this end, a diesel particulate filter (DPF) is provided in an exhaust pipe for trapping the exhausted particulates contained in the exhaust gas.

In the diesel particulate filter, the exhaust gas flowing into the filter passes through porous partitioning walls and the exhausted particulates contained in the exhaust gas are trapped by surfaces or micro holes of the partitioning walls. In the case that an amount of the exhausted particulates trapped and accumulated in the filter is excessively increased, a back pressure of the engine is increased due to an increase of flow resistance, and as a result an output of the engine may be decreased. Accordingly, it is necessary to properly remove the trapped exhausted particulates from the diesel particulate filter, to re-generate the same.

It is known in the art that an oxidation catalyst of platinum or the like is formed in the particulate filter, to make it possible to re-generate the particulate filter during an operation of the engine by use of the oxidation reaction of the oxidation catalyst. According to such a prior art, a fuel is supplied to the particulate filter, for example, by a post injection (in which the fuel is injected during an exhaust stroke of the engine). The accumulated exhausted particulates, which are relatively difficult to remove by a normal fuel injection, are removed from the particulate filter by oxidation with the combustion heat of the fuel (injected during the exhaust stroke).

A fuel consumption ratio will be decreased when an operation for re-generating the particulate filter is often performed. On the other hand, in the case that an interval for the re-generating operation is made longer, an excessive amount of the exhausted particulates may be trapped and accumulated in the particulate filter. As a result, the particulate filter may be likely to be damaged by an extremely increased high temperature due to rapid combustion of the trapped exhausted particulates during the re-generating operation.

Accordingly, it is desirable to decide an appropriate interval for the re-generating operation in consideration of the accumulated amount of the exhausted particulates. For example, in Japanese Patent Publication No. H7-332065, a pressure difference between pressures at an inlet and an outlet portion of the particulate filter is detected. The pressure difference is increased due to the increase of the flow resistance caused by the increased accumulated amount of the exhausted particulates. In the above Japanese Patent Publication, it is determined that the particulate filter is to be re-generated when the detected pressure difference exceeds a predetermined value.

It is, however, difficult in the prior art described in the above Japanese Patent Publication, to precisely detect the accumulated amount of the exhausted particulates and to determine the correct timing for the re-generating operation, since an actual accumulated amount of the exhausted particulates may differ from case to case even when an operating condition of the engine (including the pressure difference) is the same.

This is because there are two kinds of accumulated conditions of the exhausted particulates. Namely, in one of the accumulated conditions, the exhausted particulates are accumulated in the micro holes of the particulate filter, whereas the exhausted particulates are accumulated (in a form of multiple layers) on the surfaces of the particulate filter in the other type of the accumulation. And the exhausted particulates accumulated in the micro holes are more easily combusted than the exhausted particulates accumulated in the surfaces of the particulate filter, since a ratio of the exhausted particulates in the micro holes which are in contact with the oxidation catalyst is higher than that of the exhausted particulates on the surfaces of the particulate filer. A deviation of combustion amount may occur in a part of the particulate filter, or combustion may be discontinued, as a result of deviations of exhaust gas temperatures or exhaust gas flows. Furthermore, an inclination of a characteristic curve for the accumulation in the micro holes is much higher than that for the accumulation on the surfaces, and thereby a change of the pressure loss becomes much larger in the case in which the amount of the accumulated exhausted particulates is changed in line with the characteristic curve for the accumulation in the micro holes, than the case in which the amount of the accumulated exhausted particulates is changed in line with the characteristic curve for the accumulation on the surfaces. Accordingly, it is difficult to precisely detect the accumulated amount of the exhausted particulates.

SUMMARY OF THE INVENTION

The present invention is made in view of the above problems. It is an object of the present invention to provide an exhaust gas purifying apparatus for an internal combustion engine, in which timing for a re-generating operation can be appropriately determined.

According to a feature of the present invention, an exhaust gas purifying apparatus for an engine comprises; a diesel particulate filter (4) provided in an exhaust pipe (3) of the engine (1) for trapping and accumulating diesel particulates contained in exhaust gas emitted from the engine (1); an electronic control unit (51) for controlling a compulsory re-generating operation of the diesel particulate filter (4), wherein the compulsory re-generating operation is performed when an accumulated amount of the diesel particulates in the diesel particulate filer (4) reaches at a predetermined threshold value, so that the diesel particulates are combusted and removed; and a pressure loss detecting means (53a, 53b) for detecting pressure loss (ΔP) at the diesel particulate filter (4).

In the exhaust gas purifying apparatus, an accumulated amount calculating means calculates accumulated amount of the diesel particulates in the diesel particulate filter (4) based on the pressure loss (ΔP) and a first accumulation pattern (P1). The accumulation pattern (P1) has a first accumulation characteristic line (L1) for a smaller amount range of the accumulated amount and a second accumulation characteristic line (L2) for a larger amount range of the accumulated amount, and each of the first and second accumulation characteristic lines (L1 and L2) is formed as a straight line and represents a relationship between the pressure loss and the accumulated amount of the diesel particulates in the diesel particulate filter (4). A ratio of the first accumulation characteristic line (L1) for an increase of the pressure loss with respect to an increase of the accumulated amount of the diesel particulates is larger than that of the second accumulation characteristic line (L2), wherein the first accumulation characteristic line (L1) passes over an initial point, and the first and second accumulation characteristic lines (L1 and L2) cross each other at a predetermined transition point (T).

The exhaust gas purifying apparatus further comprises a threshold value correcting means for calculating a correction amount and making the threshold value to a smaller value based on the correction amount during a transitional period, in which the amount of the pressure loss is decreased depending on natural combustion of the diesel particulates in the diesel particulate filter (4) from a point (b1, b2) on the second accumulation characteristic line (L2) to a point (cz) on a line of a second accumulation pattern (P2). The line of the second accumulation pattern (P2) has the same ratio for the increase of the pressure loss with respect to the increase of the accumulated amount of the diesel particulates to that of the second accumulation characteristic line (L2), and the line of the second accumulation pattern (P2) passes over the initial point.

According to another feature of the present invention, the amount of the pressure loss is decreased from a combustion start point (b1, b2) on the second accumulation characteristic line (L2) to an accumulation re-start point (c1, c2) on an accumulation increasing line (AIL) along an accumulation decreasing characteristic curve, which comprises an accumulation decreasing line (ADL) and the accumulation increasing line (AIL), and the correction amount for correcting the threshold value is made larger as the accumulation re-start point (c1, c2) is more separated from the combustion start point.

According to a further feature of the present invention, the exhaust gas purifying apparatus further comprises a combustion amount calculating means for calculating an integrated value for combustion amount of the diesel particulates in the diesel particulate filter (4), wherein the threshold value correcting means calculates the correction amount based on the integrated value, so that the threshold value is made smaller as the integrated value of the combustion amount becomes larger.

According to a still further feature of the present invention, the exhaust gas purifying apparatus further comprises a combustion amount calculating means for calculating an integrated value for combustion amount of the diesel particulates in the diesel particulate filter (4), based on the accumulation decreasing line (ADL) of the accumulation decreasing characteristic curve.

The accumulated amount calculating means calculates the accumulated amount of the diesel particulates in the diesel particulate filter (4) based on the accumulation increasing line (AIL) of the accumulation decreasing characteristic curve, when the accumulation of the diesel particulates starts again after the natural combustion of the diesel particulates.

The accumulation increasing line (AIL) has the same ratio for the increase of the pressure loss with respect to the increase of the accumulated amount of the diesel particulates to that of the second accumulation characteristic line (L2).

The accumulation increasing line (AIL) is shifted in parallel toward a smaller amount of the pressure loss (ΔP) as the integrated value of the combustion amount becomes larger.

According to a still further feature of the present invention, the threshold value correcting means resets the threshold value so that the threshold value becomes to its initial value, when the amount of the pressure loss is decreased from the point (b1, b2) on the second accumulation characteristic line (L2) to the point (cz) on the line of the second accumulation pattern (P2) along the accumulation decreasing characteristic curve.

According to a still further feature of the present invention, the threshold value correcting means further corrects the threshold value based on operational conditions of the engine (1) during a predetermined period after the diesel particulate filter (4) has been completely re-generated by the compulsory re-generating operation.

According to a still further feature of the present invention, an intake air amount for the engine (1) is used as one of parameters representing the operational conditions of the engine (1).

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
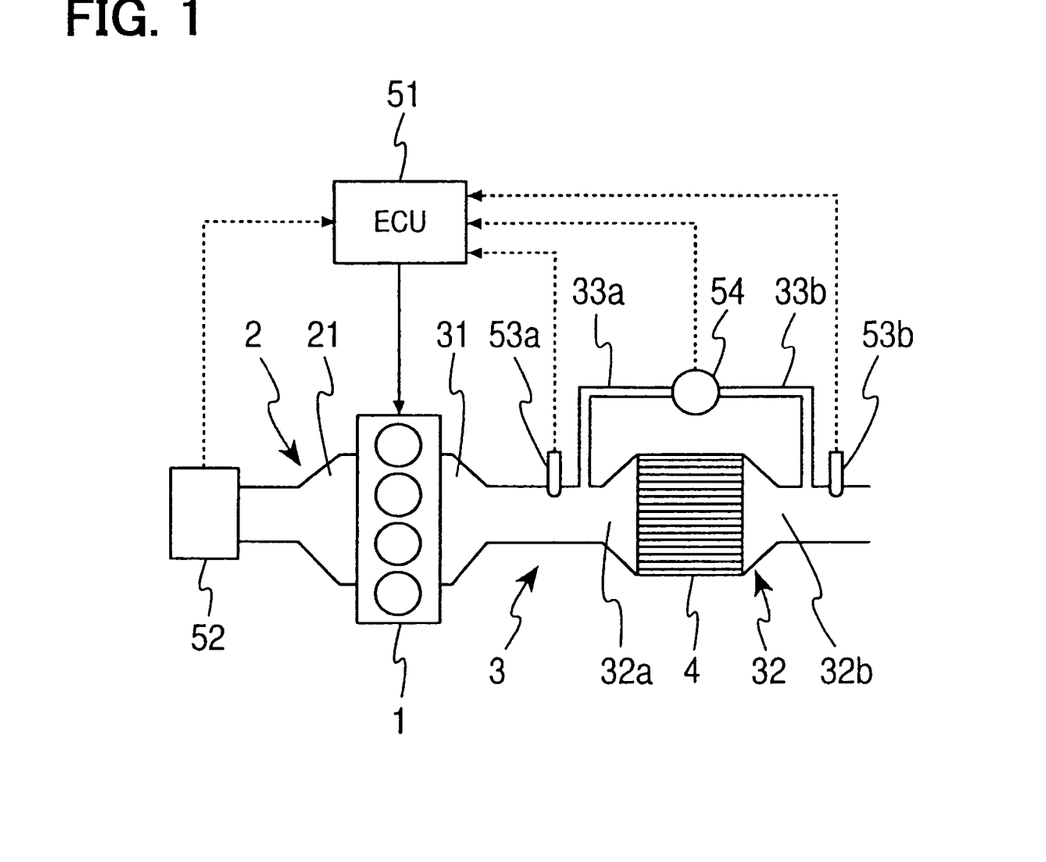
FIG. 1 is a schematic view showing an exhaust gas purifying system according to an embodiment of the present invention.

A structure of a diesel engine, to which an embodiment of the present invention is applied, is shown in FIG. 1.

The diesel engine 1 comprises a main engine body 1 having four cylinders, an intake manifold 21 connected at its downstream side to the engine body 1, and an exhaust manifold 31 connected at its upstream ends to the engine body 1. A diesel particulate filter 32 (hereinafter also referred to as DPF) is provided in an exhaust pipe 3. A main body 4 (hereinafter also referred to as DPF) of the particulate filter 32 is a ceramic filter having a well-known structure, for example a honeycomb structure formed from a heat-resisting porous ceramic, such as cordierite, silicon carbide or the like, and having multiple cells for forming gas passages, wherein inlet sides and outlet sides of the cells are alternately closed. Exhaust gas from the engine 1 flows into the DPF 4 from its inlet 32a, passes through porous partitioning walls of the DPF 4, and flows out of the DPF 4 from its outlet 32b. Exhausted particulates (diesel particulates (PM)) are trapped by and gradually accumulated in the DPF 4, depending on a driving distance. An oxidation catalyst, which is formed from noble metals, such as platinum, palladium and so on, is generally provided on surfaces of the DPF 4 of the particulate filter 32. The diesel particulates (PM) are oxidized, combusted and removed under a predetermined temperature condition.

An electronic control unit (ECU) 51 is provided to control respective components of the engine 1, including injectors.

Various signals representing an operational condition of the engine are inputted into the ECU 51. A signal for calculating an accumulated amount of the diesel particulates in the particulate filter 32 is included in the various signals, and a sensor for that purpose is provided. Temperature sensors 53a and 53b are respectively provided at an upstream and downstream side of the particulate filter 32, wherein the temperature sensors 53a and 53b penetrate through a wall of the exhaust pipe 3 to detect temperature of the exhaust gas flowing through the exhaust pipe (passage) 3. A detected temperature of the sensor 53a is a temperature of the exhaust gas flowing at the inlet 32a of the particulate filter 32, and is referred to as DPF inlet temperature, whereas a detected temperature of the sensor 53b is a temperature of the exhaust gas flowing at the outlet 32b of the particulate filter 32, and is referred to as DPF outlet temperature. A temperature representing a temperature of the particulate filter 32 (also referred to as DPF temperature) is calculated from the DPF inlet and outlet temperatures through a calculation of an average value, a filtering process and so on.

A first bypass passage 33a is provided at the upstream side of the particulate filter 32, and a second bypass passage 33b is provided at the downstream side of the particulate filter 32. A differential pressure sensor 54 is provided between the first and second bypass passages 33a and 33b, to detect a differential pressure between the pressure at the inlet 32a and the outlet 32b of the particulate filter 32. The differential pressure represents a pressure loss at the particulate filter 32.

An air flow meter 52 is provided in an intake air passage 2 of the engine 1, for detecting an amount of intake air.

Various signals representing an operational condition of the diesel engine, such as a throttle opening, a temperature of engine cooling water and other parameters are inputted into the ECU 51.

The ECU 51 comprises a well known microcomputer, and a ROM of the ECU 51 stores a re-generation control program for calculating an accumulated amount of the diesel particulates trapped in the particulate filter 32, and for determining whether a re-generation operation of the particulate filter is necessary or not based on the calculated amount of the accumulated diesel particulates, in addition to an engine operation control program for controlling respective portions and components of the engine. The ROM further memorizes information specifying the accumulation characteristics, which is used in performing the above re-generation control program.

Figure 2:
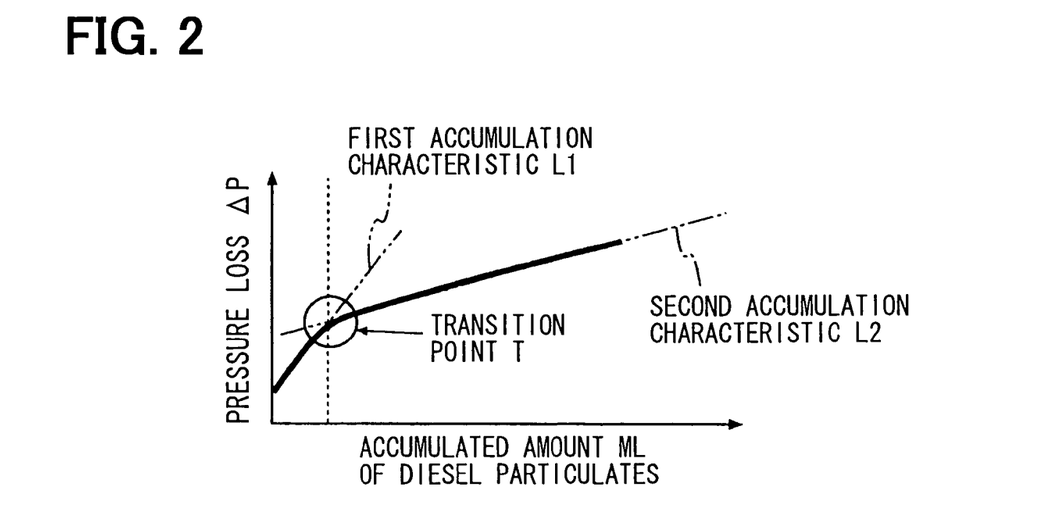
FIG. 2 is a graph showing a relation between an accumulated amount of exhausted particulates and a pressure loss, when the exhausted particulates are accumulated.

According to experiments by the inventors of the present invention, a relationship between a pressure loss $\Delta P$ and the respective amounts of the accumulated amount ML of the diesel particulates is obtained, as shown in FIG. 2.

FIG. 2 shows the pressure loss $\Delta P$ with respect to the respective amounts of the accumulated amount ML of the diesel particulates, wherein the diesel particulates will be accumulated in the particulate filter 32 of a new filter or a re-generated filter having no accumulation of the diesel particulates, when a constant amount of exhaust gas flows through the particulate filter 32. As shown in FIG. 2, the pressure loss $\Delta P$ is increased in accordance with an increase of the accumulated amount ML of the diesel particulates. A profile of the characteristic curve of the pressure loss $\Delta P$ has a convex in an upward direction. More specifically, the characteristic curve is formed from two lines, which are almost straight lines. An inclination of a first line is discontinuously changed at a transition point "T" at which the accumulated amount of the diesel particulates reaches a predetermined value. The inclination of a second straight line, which is a line obtained when the accumulated amount of the diesel particulates is larger than the predetermined value (corresponding to the transition point), is smaller than that of the first straight line. The accumulation characteristic of the diesel particulates is approximated by the above two straight lines.

Figure 3A:
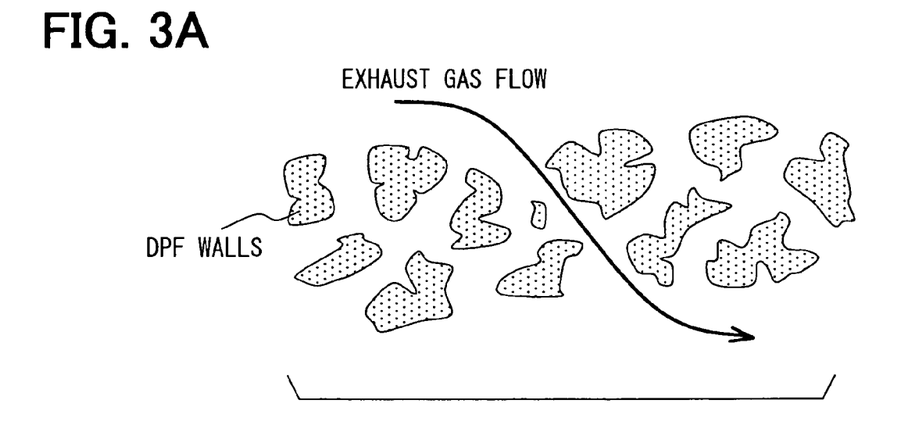
FIGS. 3A to 3C are schematic image drawings showing processes for accumulation of the exhausted particulates.
Figure 3B:
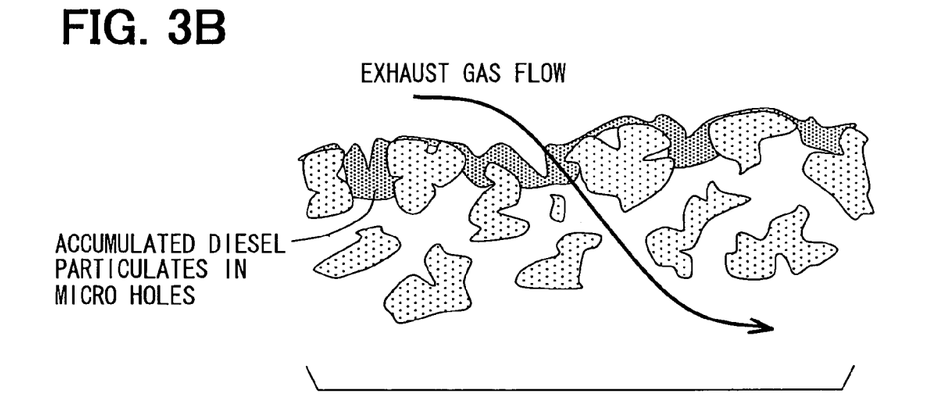
Figure 3C:
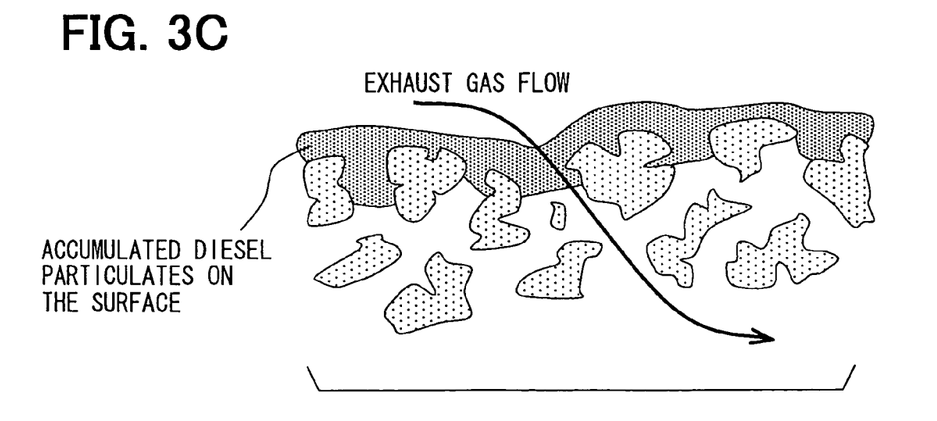

FIGS. 3A to 3C schematically show a part of the surface of the partitioning wall (hereinafter also referred to as the DPF wall), wherein the diesel particulates are gradually accumulated from a condition of FIG. 3A to that of FIG. 3C.

FIG. 3A shows the particulate filter, which is a new filter or the re-generated filter so that the diesel particulates are not yet accumulated therein. The pressure loss in this condition, which is caused when the diesel particulates pass through the DPF wall, is defined by specification of the particulate filter 32.

When the condition is changed from FIG. 3A to FIG. 3B, the diesel particulates are accumulated on the surface portions at the upstream side of the DPF wall, or accumulated into the micro holes to block them up. The pressure loss $\Delta P$ is thereby increased. Since the exhaust gas flow towards the micro holes, the block-up of the micro holes is a dominant factor for the increase of the pressure loss $\Delta P$, at the beginning (hereinafter referred to as a first stage of the accumulation). A depth of the micro holes, at which the diesel particulates reach, varies depending on flow speeds of the exhaust gas. The characteristic curve of the pressure loss at the first stage of the accumulation as well as its transition point correspondingly varies.

When the diesel particulates are accumulated in most of the micro holes, then the diesel particulates are accumulated on the surface portions as a layer, a thickness of which is increased, as shown in FIG. 3C. In this condition (in a second stage of the accumulation), the increase of the layered accumulated particulates on the surfaces of the DPF walls is a dominant factor for the increase of the pressure loss ΔP.

As above, when the diesel particulates are accumulated in most of the micro holes and the accumulated layer of the diesel particulates is formed on the surfaces of the DPF wall, the dominant factor for increasing the pressure loss ΔP varies before and after the transition point. In the condition, in which the diesel particulates are not accumulated in the micro holes, the exhaust gas smoothly flows through the particulate filter 32. On the other hand, when the diesel particulates are trapped and accumulated in most of the micro holes, the exhaust gas flow is restricted by such blocked-up micro holes, to rapidly increase the pressure loss ΔP. Accordingly, an increase ratio of the pressure loss ΔP with respect to the accumulated amount of the diesel particulates is relatively high, as indicated by the characteristic curve of the first stage accumulation shown in FIG. 2. After the diesel particulates have been trapped and accumulated in the micro holes, the dominant factor for the increase of the pressure loss ΔP is changed to the increase of the thickness in the layered accumulated particulates on the surfaces of the DPF walls. Therefore, the increase ratio of the pressure loss ΔP with respect to the accumulated amount of the diesel particulates becomes smaller, as indicated by the characteristic curve of the second stage accumulation shown in FIG. 2.

Figure 4:
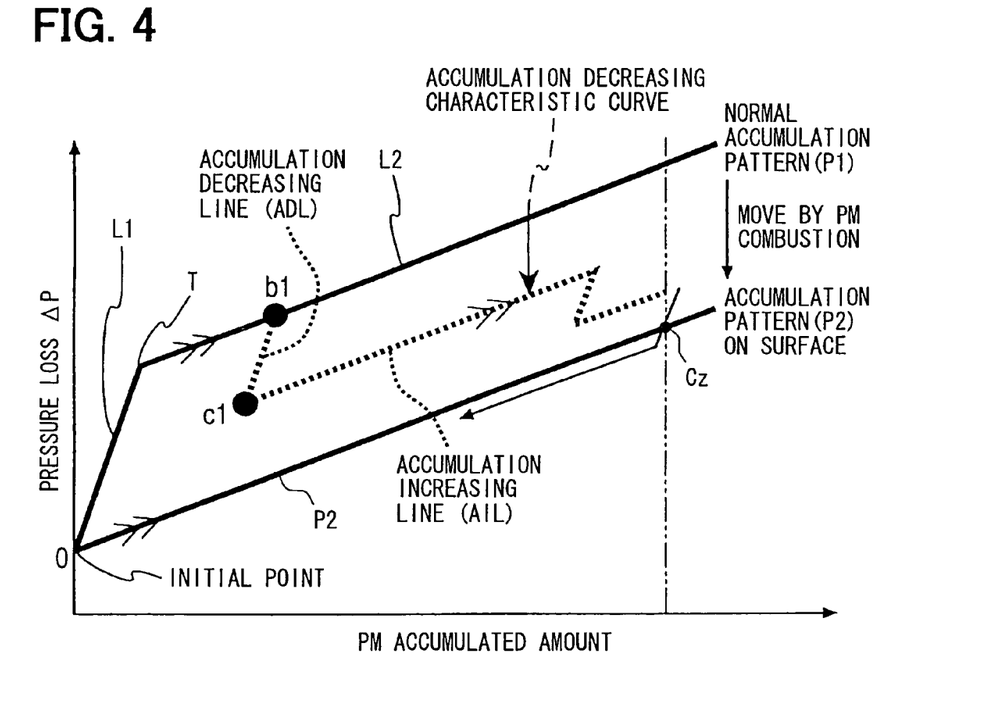
FIG. 4 is a graph showing a relation between an accumulated amount of exhausted particulates and a pressure loss, when the exhausted particulates are accumulated and when the accumulated exhausted particulates are combusted and removed.

FIG. 4 shows a normal accumulation pattern "P1" having a first accumulation characteristic line "L1" from an initial point to the transition point "T" and a second accumulation characteristic line "L2" above the transition point "T". FIG. 4 further shows a relationship (indicated by a dotted line) between the pressure loss and the accumulated amount of the diesel particulates, when the accumulated amount of the diesel particulates is decreased due to a natural re-generating operation (wherein the diesel particulates are naturally combusted and removed). When the natural re-generating operation starts at a point "b1" on the second accumulation characteristic line "L2", and the diesel particulates accumulated in the particulate filter 32 is combusted and removed, then the point of the pressure loss and the accumulated amount of the diesel particulates will be moved toward the initial point. However, the point will be moved not along the second accumulation characteristic line "L2" but on a line (the dotted line, which is referred to as an accumulation decreasing line "ADL"), the inclination of which is between the inclinations of the first and second accumulation characteristic lines "L1" and "L2". Since the combustion of the diesel particulates trapped in the micro holes during this re-generating operation is rather high, the inclination of the accumulation decreasing line "ADL" during the combustion becomes almost equal to that of the first accumulation characteristic line "L1". Accordingly, the point is moved from "b1" to "c1" in FIG. 4.

When the natural re-generating operation by the combustion is ended depending on the operational condition, for example at the point c1, the accumulation of the diesel particulates starts again. The accumulation goes on a line (a dotted line which is hereinafter referred to as an accumulation increasing line "AIL"), which is parallel to the second accumulation characteristic line "L2". When the natural re-generation starts again, then the pressure loss is likewise decreased toward the initial point.

In the above natural re-generating operation, the accumulated layer of the diesel particulates formed on the surfaces of the diesel particulate filter is not combusted and removed. Therefore, when the accumulation of the diesel particulates starts again at the point c2, the accumulation occurs not in the micro holes but on the surfaces of the diesel particulate filter. As a result, the accumulation goes on the line of the accumulation increasing line "AIL". A difference of the pressure loss between the second accumulation characteristic line "L2" and the accumulation increasing line "AIL" corresponds to the amount of combusted diesel particulates in the micro holes during the natural re-generating operation.

The point "b1", at which the natural re-generating operation starts, is referred to as a combustion start point, while the point "c1", at which the accumulation starts again, is referred to as an accumulation re-start point.

As a result of repeating the natural re-generating operation, the point of the pressure loss is finally moved to a point "cz" on a line of an accumulation pattern "P2".

The accumulation pattern "P2" in FIG. 4 shows a characteristic curve of the pressure loss, when the accumulated diesel particulates are only on the surfaces of the DPF walls, as a result that almost all of the accumulated diesel particulates trapped in the micro holes are combusted and removed. The accumulation pattern "P2" has an inclination identical to that of the second accumulation characteristic line "L2", wherein the accumulation pattern "P2" passes through the initial point.

The above normal accumulation pattern "P1", which has the first accumulation characteristic line "L1" from the initial point to the transition point "T" and the second accumulation characteristic line "L2" above the transition point "T", is memorized in the ROM of the ECU 51 as an accumulation amount map for the accumulated amount of the diesel particulates. The normal accumulation pattern "P1" is obtained in advance based on data through experiments.

The pressure loss "ΔP" under the predetermined flow amount of the exhaust gas is calculated from the detected differential pressure and the detected flow amount of the exhaust gas. Then, an accumulated amount of the diesel particulates is calculated based on the above pressure loss "ΔP" and the accumulation amount map. The flow amount of the exhaust gas is obtained, for example, by correcting an intake air amount depending on the temperature of the particulate filter 32.

When calculating the accumulated amount of the diesel particulates based on the normal accumulation pattern "P1" memorized as the accumulation amount map, an amount of combustion of the accumulated diesel particulates is calculated at first, and the accumulation pattern "P1" (the second accumulation characteristic line "L2") is shifted in a direction of decreasing the pressure loss by the calculated combustion amount.

When the accumulated amount of the diesel particulates, as calculated as above, reaches at a predetermined threshold value (a threshold value for starting the compulsory re-generating operation), a compulsory re-generating operation is performed for the particulate filter 32, for example, by a post injection operation or the like. As a result, almost all accumulated diesel particulates are removed from the particulate filter 32 (a complete re-generation), so that an excessive accumulation of the diesel particulates can be prevented.

Figure 5:
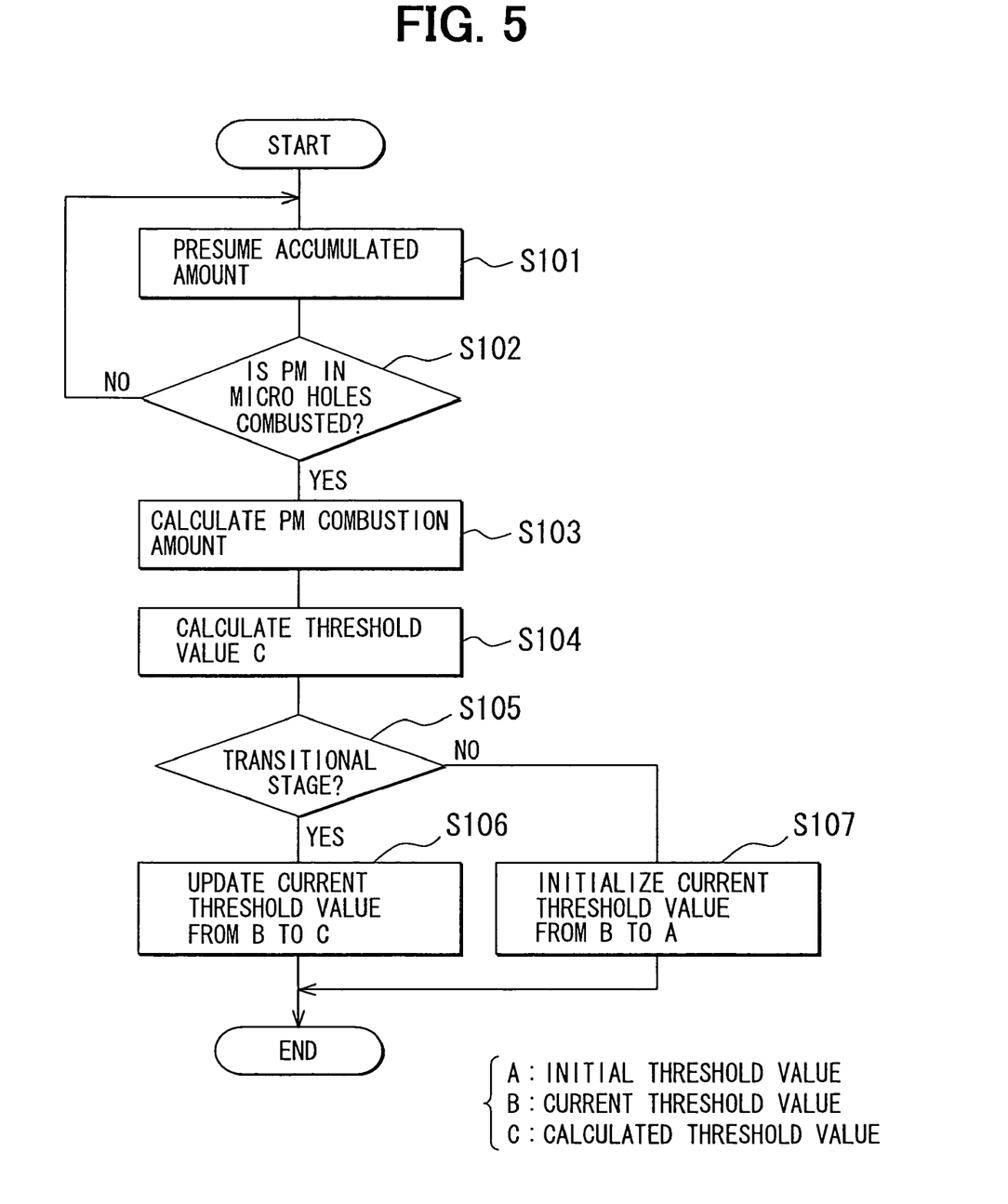
FIG. 5 is a flow chart showing a process of the embodiment.

FIG. 5 shows a flow chart for performing the re-generating operation of the particulate filter 32, which is controlled by the ECU 51.

A step S101 is a step for presuming an accumulated amount of the diesel particulates based on the normal accumulation pattern "P1".

At a step S102, the ECU 51 determines whether or not the diesel particulates trapped in the micro holes is being combusted as the natural re-generating operation. The determination is done based on the detected DPF temperature. The ECU 51 determines that the combustion of the diesel particulates is being done, when the detected DPF temperature is higher than a predetermined value. When the ECU 51 determines that the diesel particulates are not being combusted, the process goes back to the step S101.

When the ECU 51 determines that the diesel particulates are being combusted, the process goes to a step S103, at which the combustion amount of the diesel particulates in the micro holes is calculated and integrated.

Figure 6:
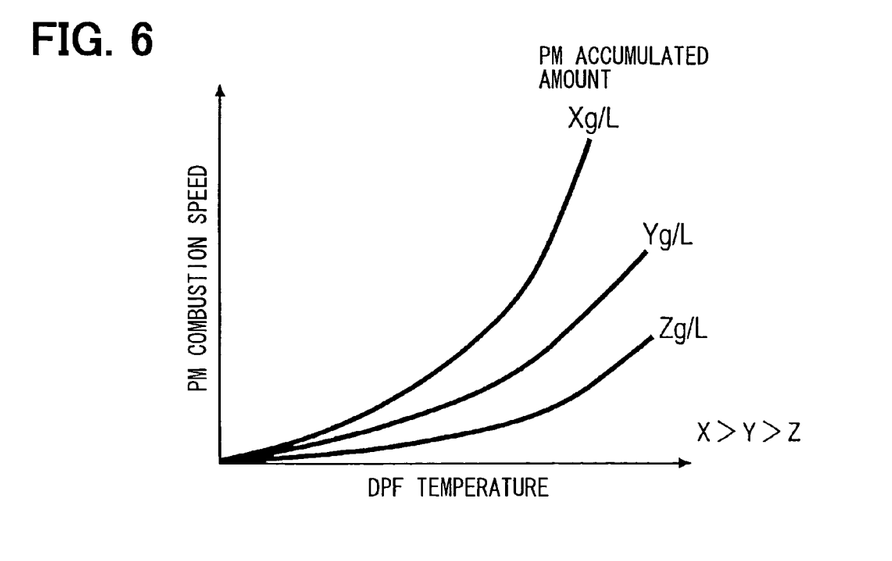
FIG. 6 is a graph showing a combustion speed of exhausted particulates (PM) with respect to temperature of a particulate filter.

FIG. 6 shows a relationship between a combustion speed of the diesel particulates and the DPF temperature, wherein it is shown that the combustion speed of the diesel particulates becomes higher as the DPF temperature is higher and as the accumulated amount of the diesel particulates is larger.

The combustion amount of the diesel particulates trapped in the micro holes, as calculated at the step S103, corresponds to a combustion speed of the diesel particulates for a unit time period (a control cycle). The combustion amount is calculated from the DPF temperature and the accumulated amount of the diesel particulates. This calculation is done based on a combustion amount map, in which the combustion amount is defined with respect to the DPF temperature and the accumulated amount of the diesel particulates. More specifically, the integrated value of the combustion amount for the diesel particulates trapped in the micro holes is updated by adding the combustion amount of this time to the combustion amount of the previous calculation.

The combustion amount of the diesel particulates trapped in the micro holes depends on, in addition to the DPF temperature and the accumulated amount of the diesel particulates, a density of nitrogen oxide (NOx), a density of oxygen, the pressure loss "ΔP", an engine rotational speed, a fuel injection amount, a vehicle speed, an intake air amount, and so on. Therefore, those parameters may be also taken into consideration to more precisely calculate the combustion amount of the diesel particulate.

At steps S104 to S107, the ECU 51 performs processes for correcting the threshold value for starting the compulsory re-generating operation. The threshold value is a predetermined value for determining whether it is necessary to start the compulsory re-generating operating for compulsorily combusting the diesel particulates accumulated in the particulate filter 32. The threshold value is set at a predetermined value A as an initial threshold value, after the previous compulsory re-generating operation has been completed. At the step S104, the ECU 51 calculates the threshold value based on the combustion amount of the diesel particulates trapped in the micro holes, namely the ECU 51 calculates a new threshold value "C".

More specifically, the calculation and correction of the threshold value "C" is performed based on the integrated value (obtained at the step S103) of the combustion amounts of the diesel particulates, in the following manner.

Figure 7:
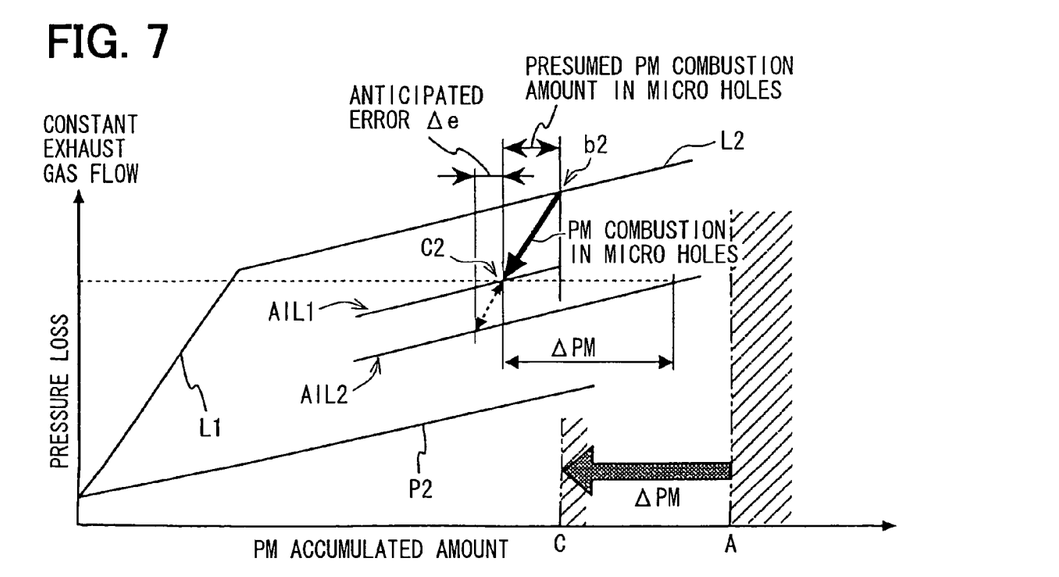
FIG. 7 is a second graph showing a relation between an accumulated amount of exhausted particulates and a pressure loss, when the exhausted particulates are accumulated and when the accumulated exhausted particulates are combusted and removed.

FIG. 7 shows the relationship between the pressure loss "ΔP" and the accumulated amount of the diesel particulates. As already explained with reference to FIG. 4, the point for the pressure loss "ΔP" and the accumulated amount of the diesel particulates is moved along the first and second accumulation characteristic lines "L1" and "L2", when the accumulated amount of the diesel particulates is increased without natural combustion of the diesel particulates. The point of the pressure loss and the accumulated amount is moved toward their lower sides, when the natural combustion of the diesel particulates has started. Since the natural combustion is generally focused on the diesel particulates trapped in the micro holes, as explained above, the point of the pressure loss and the accumulated amount is moved back not on the second accumulation characteristic line "L2", but moved toward the accumulation pattern "P2" for the surface accumulation along the accumulation decreasing line "ADL". Namely, the pressure loss and the accumulated amount are decreased from a point "b2" to a point "c2", as indicated by an arrow in FIG. 7. The inclination of the decrease (the arrow) is substantially equal to that of the first accumulation characteristic line "L1".

An accumulation increasing line "AIL1" after the natural combustion can be obtained in the following process. The point "c2" (of the pressure loss and the accumulated amount of the diesel particulates) is calculated from the integrated value of the combustion amount of the diesel particulates trapped in the micro holes. Namely, the point "c2", is obtained by moving the point from "b2" on the accumulation decreasing line "ADL" by such an amount corresponding to the integrated value of the combustion amount. And the second accumulation characteristic line "L2" is moved in parallel to such a position, at which the moved accumulation characteristic line "L2" (=the accumulation increasing line "AIL1") passes through the point "c2".

As above, the actual accumulated amount of the diesel particulates is changed as a result of the natural combustion of the diesel particulates. In particular when the natural combustion of the diesel particulates (the natural re-generating operation) is interrupted before reaching to the accumulation pattern P2, for example at the point c2, as shown in FIG. 7, the presumption accuracy of the accumulated amount of the diesel particulates would be largely decreased. And an error may be included in the calculation of the accumulated amount representing a value, which may be smaller than the actual accumulated amount. According to the present invention, therefore, an amount of such error is largely anticipated, so that the actual accumulated amount is prevented from becoming too excessive. Namely, the threshold value for starting the compulsory re-generating operation is shifted to a smaller side (i.e. to a safer side), so that timing for starting the compulsory re-generating operation is prevented from becoming too late compared with an ideal timing.

More detailed operation is explained below. If an error was included in the calculation of the integrated value of the combustion amount for the diesel particulates in the micro holes (hereinafter, the error is referred to as an anticipated error "Δe"), the accumulation increasing line "AIL1" is moved (displaced) to an accumulation increasing line "AIL2".

Then an anticipated displacement value "ΔPM" in terms of the accumulated amount of the diesel particulates can be calculated by the following formula (1), wherein "k1" is the inclination of the accumulation decreasing line "ADL" and "k2" is the inclination of the second accumulation characteristic line "L2":

$$\Delta PM = \left(\frac{k_1 - k_2}{k_2}\right) \times \Delta e \quad (1)$$

As understood from the above (FIG. 7), if the combustion amount was calculated in a manner that the calculated combustion amount of the diesel particulates is smaller than the actual value by the anticipated error "Δe", the accumulated amount of the diesel particulates obtained by the calculation becomes smaller than the actual accumulated amount by the anticipated displacement value "ΔPM".

Accordingly, at the step S104, the anticipated displacement value "ΔPM" is regarded as a correction amount for the current threshold value "B" (in FIG. 7, the current threshold value "B" is equal to the initial threshold value "A"), and a corrected threshold value "C" is calculated by subtracting the correction amount (=the anticipated displacement value "ΔPM") from the current threshold value "B" (=threshold value "A").

At the step S105, the ECU 51 determines whether the accumulation increasing line has reached at the accumulation pattern "P2" for the surface accumulation, or whether the accumulation increasing line is still in a transitional stage moving to the accumulation pattern "P2" for the surface accumulation. This determination is done by checking whether or not the combustion amount (calculated at the step S103) of the diesel particulates in the micro holes has reached at a predetermined value. The predetermined value is set at an upper limit amount for trapping the diesel particulates in the micro holes, which corresponds to the accumulated amount at the transition point. The ECU 51, therefore, determines that the accumulation increasing line is in the transitional stage to the accumulation pattern "P2" for the surface accumulation, in the case that the combustion amount of the diesel particulates in the micro holes has not reached at the predetermined value.

In case of YES at the step S105, the process goes to the step S106, at which the current threshold value "B" is replaced by the corrected threshold value "C" (calculated at the step S104).

In case of NO at the step S105, the process goes to the step S107, at which the current threshold value "B" is replaced by the initial threshold value "A". The anticipated displacement value "ΔPM", which is used for calculating the corrected threshold value "C", represents the amount of the displacement between the calculated accumulation increasing line "AIL1" and the shifted accumulation increasing line "AIL2", and depends on the combustion amount. Accordingly, the anticipated displacement value "ΔPM" can be regarded as zero, when all of the diesel particulates trapped in the micro holes have been burned out, and when it is presumed that the diesel particulates may remain only in the surface portion of the particulate filter. And in such condition, the pressure loss is changed along the accumulation pattern "P2". Therefore, the current threshold value "B" is replaced by the initial threshold value "A", at the step S107.

Figure 8:
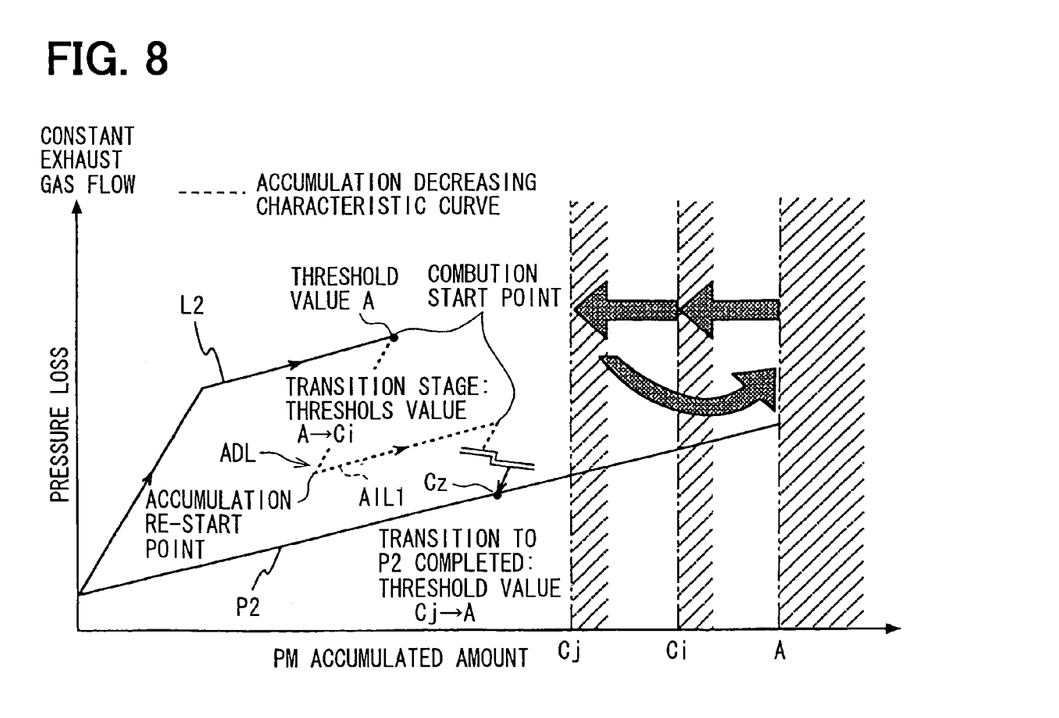
FIG. 8 is a third graph showing a relation between an accumulated amount of exhausted particulates and a pressure loss, when the exhausted particulates are accumulated and when the accumulated exhausted particulates are combusted and removed.

FIG. 8 shows a change of the current threshold value "B". The threshold value is set at the initial threshold value "A", until the normal combustion of the diesel particulates starts. When the normal combustion has started and the movement of the point (for the pressure loss and the accumulated amount of the diesel particulates) is changed from the accumulation decreasing line "ADL" to the accumulation increasing line "AIL1", the threshold value is changed from the initial threshold value "A" to the corrected threshold value "Ci", which is calculated based on the anticipated error "Δe". When the combustion of the diesel particulates starts again thereafter, the threshold value is changed from "Ci" to "Cj" in the similar manner. Since the anticipated error "Δe" is accumulated for the respective combustions of the diesel particulates, the current threshold value B is gradually decreased to a safer side (from "Ci" to "Cj", from "Cj" to "Ck", . . . ). The current threshold value "B" is finally replaced by the initial threshold value "A", when all of the diesel particulates trapped in the micro holes have been burned out and the accumulation increasing line "AIL" has reached at the accumulation pattern "P2" for the surface accumulation.

As above, the accumulated amount of the anticipated error becomes larger, as the combustion amount of the diesel particulates becomes larger. The correction amount for the threshold value is made larger, when the combustion amount of the diesel particulates becomes larger.

In other words, the current threshold value "B" is decreased to the smaller value, namely it is shifted to the safer side, depending on the increase of the accumulated amount of the anticipated error "Δe". As a result, it can be avoided that the timing for starting the compulsory re-generating operation for the diesel particulate filter 32 would be too much delayed. On the other hand, the current threshold "B" is replaced by the initial threshold value "A", when the accumulation increasing line "AIL" has reached at the accumulation pattern "P2" for the surface accumulation. As a result, it can be avoided that the timing for starting the compulsory re-generating operation would become too early. The compulsory re-generating operation for the diesel particulate filter 32 can be performed at the proper intervals.

In the above embodiment, the pre-registered accumulation pattern "P1" is used as the first accumulation characteristic line after the completion of the re-generation for the diesel particulate filer.

The accumulation characteristic line can be, alternatively, corrected in the following manner, to achieve a more precise operation. The depth of the micro holes, into which the diesel particulates flow and reach, depends on the flow speed of the exhaust gas. The first accumulation characteristic line "L1" as well as the transition point "T" is accordingly changed, depending on the flow speed of the exhaust gas. Therefore, a more precise control for starting the compulsory re-generating operation can be achieved, if a possible change of the first accumulation characteristic line "L1" and/or the transition point "T" are anticipated depending on the operational condition of the engine, during a predetermined period after the diesel particulate filter has been completely re-generated by the previous compulsory re-generating operation, and the threshold value is changed in accordance with such anticipated change of the first accumulation characteristic line "L1" and/or the transition point "T".

The flow speed of the exhaust gas depends on the intake air amount of the engine 1. A relationship between the intake air amount (detected by the air flow meter 52) and a variation of the first accumulation characteristic line "L1" is obtained based on experiments. Then, the threshold value is corrected based on a map made from the above relationship between the intake air amount and the variation of the first accumulation characteristic line "L1". An engine rotational speed or any other parameters representing the operational conditions of the engine can be also used instead of the intake air amount.

In the above embodiment, the anticipated error "Δe" is calculated based on the combustion amount of the diesel particulates trapped in the micro holes, and the correction amount "ΔPM" for correcting the threshold value is calculated from the anticipated error "Δe". It can be, however, modified in such a simpler manner, in which the correction amount "ΔPM" is made to become larger as the combustion period becomes longer.

Figure 9:
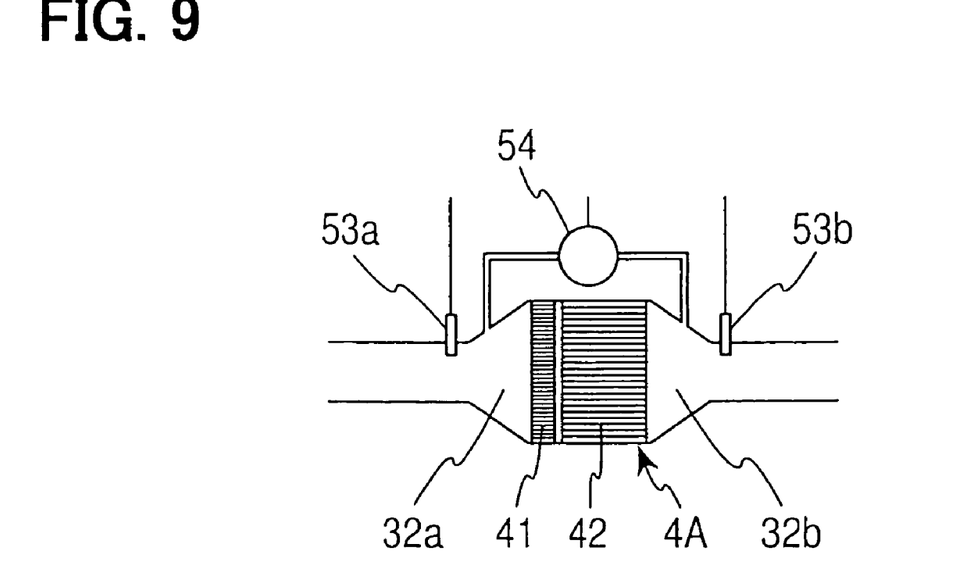
FIG. 9 is a schematic view showing a first modification of the embodiment.

The diesel particulate filter 4A can be modified, as shown in FIG. 9, in which the filter 4A is composed of two parts 41 and 42, wherein the catalyst is carried in the first part 41 of the filter provided at an upstream side of the second part 42.

Figure 10:
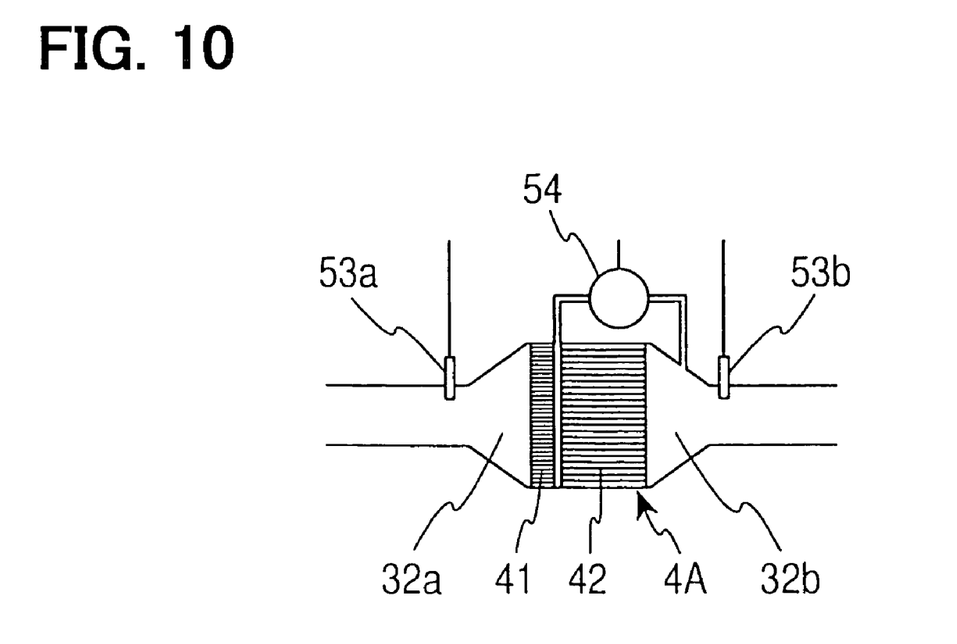
FIG. 10 is a schematic view showing a second modification of the embodiment.

The differential pressure sensor 54 can be arranged to detect the differential pressure between the upstream and the downstream pressures of the second part 42 of the filter 4A, as shown in FIG. 10.

Figure 11:
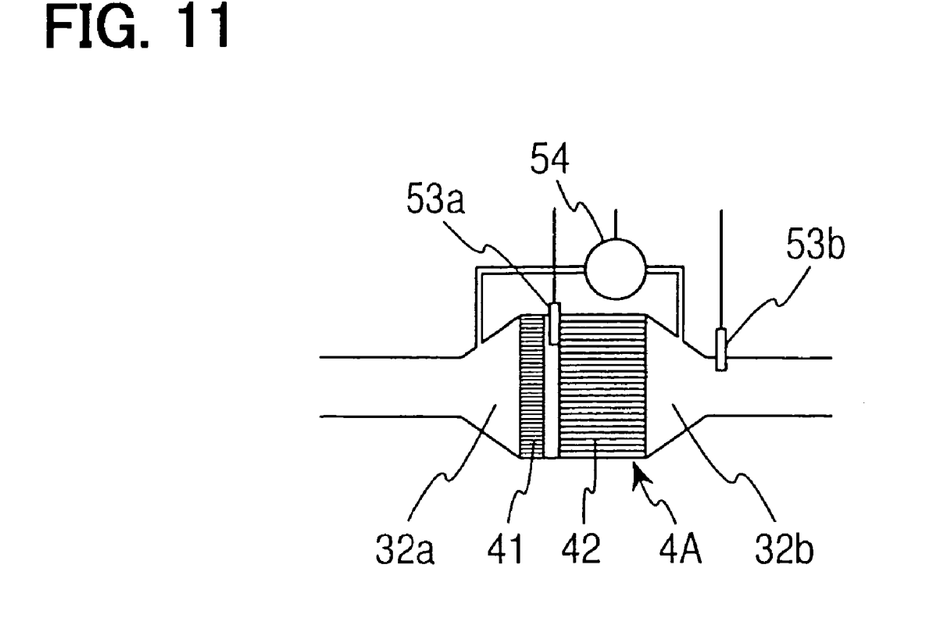
FIG. 11 is a schematic view showing a third modification of the embodiment.

The temperature sensor 53a can be provided between the first and second parts 41 and 42 of the diesel particulate filter 4A, as shown in FIG. 11.

Figure 12:
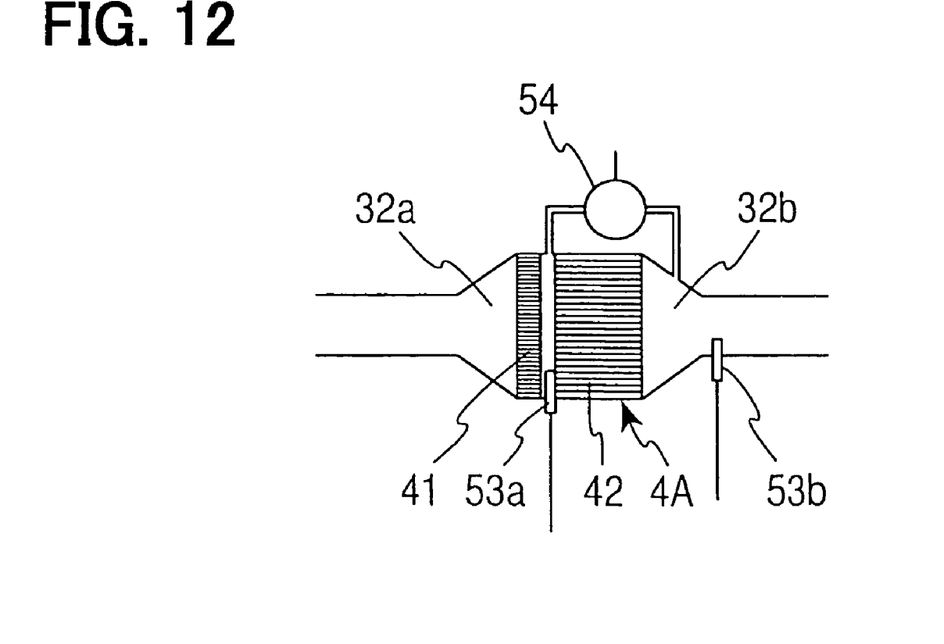
FIG. 12 is a schematic view showing a fourth modification of the embodiment.

Furthermore, the above features of FIGS. 10 and 11 can be combined, as shown in FIG. 12. Namely, the differential pressure sensor 54 is arranged to detect the differential pressure between the upstream and the downstream pressures of the second part 42, and the temperature sensor 53a is provided between the first and second parts 41 and 42 of the diesel particulate filter 4A.

What is claimed is:

1. An exhaust gas purifying apparatus for an internal combustion engine comprising:
    a diesel particulate filter provided in an exhaust pipe of the engine for trapping and accumulating diesel particulates contained in exhaust gas emitted from the engine;
    an electronic control unit for controlling a compulsory re-generating operation of the diesel particulate filter, wherein the compulsory re-generating operation is performed when an accumulated amount of the diesel particulates in the diesel particulate filter reaches at a predetermined threshold value, so that the diesel particulates are combusted and removed;
    a pressure loss detecting means for detecting pressure loss at the diesel particulate filter;
    an accumulated amount calculating means for calculating accumulated amount of the diesel particulates in the diesel particulate filter based on the pressure loss and a first accumulation pattern, the accumulation pattern having a first accumulation characteristic line for a smaller amount range of the accumulated amount and a second accumulation characteristic line for a larger amount range of the accumulated amount, each of the first and second accumulation characteristic lines being formed as a straight line and representing a relationship between the pressure loss and the accumulated amount of the diesel particulates in the diesel particulate filter, wherein a ratio of the first accumulation characteristic line for an increase of the pressure loss with respect to an increase of the accumulated amount of the diesel particulates is larger than that of the second accumulation characteristic line, the first accumulation characteristic line passes over an initial point, and the first and second accumulation characteristic lines cross each other at a predetermined transition point; and
    a threshold value correcting means for calculating a correction amount and making the threshold value to a smaller value based on the correction amount during a transitional period, in which the amount of the pressure loss is decreased depending on natural combustion of the diesel particulates in the diesel particulate filter from a point on the second accumulation characteristic line to a point on a line of a second accumulation pattern, the line of the second accumulation pattern having the same ratio for the increase of the pressure loss with respect to the increase of the accumulated amount of the diesel particulates to that of the second accumulation characteristic line, and line of the second accumulation pattern passing over the initial point.

2. An exhaust gas purifying apparatus according to claim 1, wherein
    the amount of the pressure loss is decreased from a combustion start point on the second accumulation characteristic line to an accumulation re-start point on an accumulation increasing line along an accumulation decreasing characteristic curve, which comprises an accumulation decreasing line and the accumulation increasing line, and
    the correction amount for correcting the threshold value is made larger as the accumulation re-start point is more separated from the combustion start point.

3. An exhaust gas purifying apparatus according to claim 1, further comprising:
    a combustion amount calculating means for calculating an integrated value for combustion amount of the diesel particulates in the diesel particulate filter,
    wherein the threshold value correcting means calculates the correction amount based on the integrated value, so that the threshold value is made smaller as the integrated value of the combustion amount becomes larger.

4. An exhaust gas purifying apparatus according to claim 2, further comprising:
    a combustion amount calculating means for calculating an integrated value for combustion amount of the diesel particulates in the diesel particulate filter,
    wherein the threshold value correcting means calculates the correction amount based on the integrated value, so that the threshold value is made smaller as the integrated value of the combustion amount becomes larger.

5. An exhaust gas purifying apparatus according to claim 1, further comprising:
    a combustion amount calculating means for calculating an integrated value for combustion amount of the diesel particulates in the diesel particulate filter, based on the accumulation decreasing line of the accumulation decreasing characteristic curve,
    wherein the accumulated amount calculating means calculates the accumulated amount of the diesel particulates in the diesel particulate filter based on the accumulation increasing line of the accumulation decreasing characteristic curve, when the accumulation of the diesel particulates starts again after the natural combustion of the diesel particulates,
    wherein the accumulation increasing line has the same ratio for the increase of the pressure loss with respect to the increase of the accumulated amount of the diesel particulates to that of the second accumulation characteristic line, and
    wherein the accumulation increasing line is shifted in parallel toward a smaller amount of the pressure loss as the integrated value of the combustion amount becomes larger.

6. An exhaust gas purifying apparatus according to claim 2, further comprising:
    a combustion amount calculating means for calculating an integrated value for combustion amount of the diesel particulates in the diesel particulate filter, based on the accumulation decreasing line of the accumulation decreasing characteristic curve,
    wherein the accumulated amount calculating means calculates the accumulated amount of the diesel particulates in the diesel particulate filter based on the accumulation increasing line of the accumulation decreasing characteristic curve, when the accumulation of the diesel particulates starts again after the natural combustion of the diesel particulates,
    wherein the accumulation increasing line has the same ratio for the increase of the pressure loss with respect to the increase of the accumulated amount of the diesel particulates to that of the second accumulation characteristic line, and wherein the accumulation increasing line is shifted in parallel toward a smaller amount of the pressure loss as the integrated value of the combustion amount becomes larger.

7. An exhaust gas purifying apparatus according to claim 1, wherein the threshold value correcting means resets the threshold value so that the threshold value becomes to its initial value, when the amount of the pressure loss is decreased from the point on the second accumulation characteristic line to the point on the line of the second accumulation pattern along the accumulation decreasing characteristic curve.

8. An exhaust gas purifying apparatus according to claim 1, wherein the threshold value correcting means further corrects the threshold value based on operational conditions of the engine during a predetermined period after the diesel particulate filter has been completely re-generated by the compulsory re-generating operation.

9. An exhaust gas purifying apparatus according to claim 8, wherein an intake air amount for the engine is used as one of parameters representing the operational conditions of the engine.

* * * * *